United States Patent [19]

Slack et al.

[11] Patent Number: 4,930,061

[45] Date of Patent: May 29, 1990

[54] METHOD AND NETWORK FOR ENHANCING POWER FACTOR OF OFF-LINE SWITCHING CIRCUIT

[75] Inventors: William F. Slack, Lake Hiawatha; James C. Wadlington, Mendham, both of N.J.

[73] Assignee: AT&T Bell Laboratories, Murray Hill, N.J.

[21] Appl. No.: 335,012

[22] Filed: Apr. 7, 1989

[51] Int. Cl.⁵ ............................................. H02M 1/12
[52] U.S. Cl. ...................................... 363/44; 323/208; 363/48; 363/126
[58] Field of Search ...................... 363/44–48, 363/114, 126, 37; 323/208; 315/200 R, 247

[56] References Cited

U.S. PATENT DOCUMENTS

| 4,222,096 | 9/1980 | Capewell | 363/44 |
| 4,369,490 | 1/1983 | Blum | 363/48 |
| 4,672,522 | 6/1987 | Lesea | 363/48 |

FOREIGN PATENT DOCUMENTS

| 258576 | 3/1988 | European Pat. Off. | |
| 3012747 | 10/1981 | Fed. Rep. of Germany | 363/45 |
| 157261 | 12/1981 | Japan | 363/44 |
| 163271 | 9/1983 | Japan | 363/45 |
| 148565 | 8/1984 | Japan | 363/48 |
| 197168 | 10/1985 | Japan | 363/45 |

OTHER PUBLICATIONS

"How to Reduce Switching-Supply Input-Line Harmonics", Randall, R., copyright 1981 by CMP Publications Inc., Reprinted with permission from *Electronic Engineering Times*.

Primary Examiner—William H. Beha, Jr.
Attorney, Agent, or Firm—Alfred G. Steinmetz

[57] ABSTRACT

An arrangement for improving the power factor at the input of an off-line switching type power supply is operative to extend the duration of the pulse current conducted by the diode rectifiers. A parallel LC ringing circuit is introduced between the AC line and the rectifier of the switching type power supply to enhance the voltage enabling conduction of the rectifying diodes and hence initiate current flow through the rectifying diodes earlier in each half cycle. This extends the conduction interval of the rectifying diodes significantly and enhances the power factor at the input to the switching type power supply.

5 Claims, 3 Drawing Sheets

METHOD AND NETWORK FOR ENHANCING POWER FACTOR OF OFF-LINE SWITCHING CIRCUIT

FIELD OF THE INVENTION

This invention relates to a method and apparatus for the enhancement of power factor at the input to off-line switch mode power supplies and in particular to power factor correction at the input by control of the rectified current waveform.

BACKGROUND OF THE INVENTION

Switch mode power supplies which operate off of an AC line generally have a passive filter and a rectifier which charges a subsequent large charge storage capacitor which in turn shunts the input to the subsequent switching circuitry of the power supply. Current input to the rectifier tends to occur in short pulse-like waveforms with high peak values which are very short in duration compared to the period of the substantially sinusoidal waveform of the input AC voltage. This is due in part to the acquired voltage of the charge storage capacitor back biasing the rectifying diodes during a large fraction of the input voltage waveform period whereby current is drawn from the AC line only during the peak portions of the AC voltage waveform. This pulsed input current has a high RMS current component and is rich in odd harmonics resulting in a poor power factor at the input of the power supply.

Techniques to improve the power factor of a power supply operated off of an AC line have included many approaches to reduce the harmonic components of the current such as utilizing passive low frequency input filtering which is designed to attenuate specific low frequency odd harmonics of the input current. Due to the need to provide individual filters to filter each low frequency odd harmonic, the magnetic components required add substantial bulk and weight to the power supply and are only operative at very specific harmonic frequencies. Their use is not desirable in many applications because of size and weight considerations.

In one particular power factor correction scheme disclosed in U.S. Pat. No, 4,369,490 a wave transforming network is connected at the AC side to a power rectifier. It is operative to convert the input sinusoidal signal waveform to a trapezoidal waveshape. The circuit components of this network include a storage inductance and a storage capacitor in which the two components are resonant at a frequency greater than two but less than three times the frequency of the input AC sinusoidal signal. The storage inductance and the storage capacitor are connected in a T arrangement in some embodiments and a series arrangement in others. Both arrangements are asserted to reduce harmonics and improve power factor at the input. A parallel resonant connection of the storage inductance and the storage capacitor is noted in this patent as a prior art arrangement that may be tuned to filter a specific harmonic. This arrangement is professed to be unsatisfactory because a separate filter is needed for each specific frequency of the harmonics that are suppressed.

Active control of the current wave shape can be used to control the input impedance to approximate a resistive load at the input and produce a very high power factor at the input. This active control may be provided by a boost type converter. This boost type converter typically includes a regulatory feedback control to control the duty ratio of its power switch. This converter is inserted between the rectifier and the storage capacitor and regulated to control the current waveform. A subsequent power converter is used to achieve the desired line and load regulation. This arrangement however adds considerable overhead expense to the power supply and the high parts count incurred with the added circuitry also significantly reduces its reliability.

SUMMARY OF THE INVENTION

A very simple and cost competitive arrangement of improving the power factor at the input of a switching type power supply is operative to extend the duration of the pulse current conducted by the diode rectifiers. A parallel LC ringing circuit is introduced between the AC line and the rectifier of the switching type power supply to enhance the voltage enabling conduction of the rectifying diodes and hence initiate current flow through the rectifying diodes earlier in each half cycle. A ringing frequency is selected such that during a time interval beginning when the rectifier conduction stops until sometime into the next half cycle of applied AC voltage the ringing tank circuit has rung at least one or more half cycles so that the voltage across the tank capacitor adds to the input voltage to prematurely initiate conduction in the rectifier again in the new half cycle. With precise timing the voltage of the capacitor of the ringing circuit peaks during a minima of the ripple voltage across the rectifier filter capacitor and significantly advances the start of initial conduction of the rectifying diodes. The current inertia of the inductor of the ringing circuit extends the duration of the tail end of the induction interval. This extended conduction interval significantly enhances the power factor at the input to the switching type power supply by reducing the peak value of the rectified current, extending the duration of conduction of the rectifying diodes and thereby and thereby reducing the RMS value of the rectified current.

DETAILED DESCRIPTION

Figure 1:
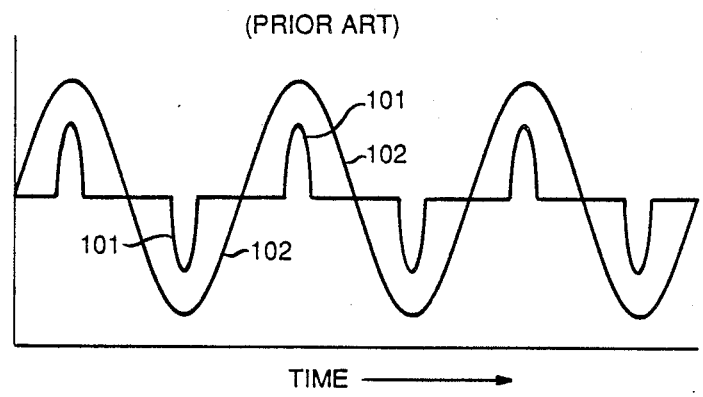
FIG. 1 is a waveform diagram of voltage and current of the rectifier of an off-line switching type power circuit where no provision is made to improve power factor at the input.

A waveform diagram of voltage and current of the rectifier of an offline switching type power circuit having an input rectifier where no provision is made to improve power factor at the input is shown in FIG. 1. Because the rectifier output charges a large charge storage capacitor shunting the input to the subsequent switching circuitry of the power supply, current input to the power supply tends to occur in short pulse-like waveforms 101 and high peak values which are very short in duration compared to the period of the substantially sinusoidal waveform 102 of the input AC voltage. This is due in part to the acquired voltage of the charge storage capacitor at the rectifier output back biasing the rectifying diodes during a large fraction of the input voltage waveform period. Hence the current is drawn from the AC line only during the peak portions of the AC voltage waveform. This pulsed input current has a very short duration with a high RMS current component and is rich in odd harmonics resulting in a poor power factor at the input of the power supply.

Figure 2:
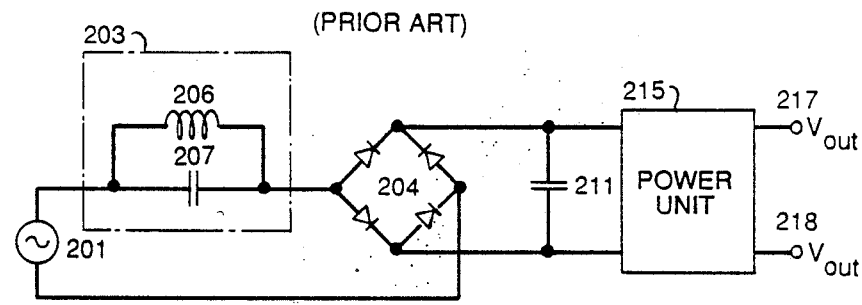
FIG. 2 is a schematic of an off line power switching type supply utilizing parallel tuned passive filter network techniques of the prior art to block a specific odd harmonic and hence reduce the peak value of rectified current and improve input power factor.

A typical passive network arrangement for enhancing the power factor at the input by reducing harmonics at the input to an off-line switch mode power supply is shown in FIG. 2. Large harmonic currents are known to produce a poor power factor and hence the circuit in FIG. 2 is designed to block an odd harmonic with a filter circuit 203 and consequently improve the power factor at the input. A parallel tuned harmonic blocking filter 203 is connected intermediate the AC line source 201 and a full wave rectifier 204. The harmonic blocking filter 203 includes an inductor 206 and a capacitor 207 and is normally tuned to block the third harmonic of the applied AC voltage supplied by the AC line source 201. Since the lower order odd harmonics contribute to a high peak value of current; elimination of these harmonics reduces the peak value of the current and improves the power factor at the input. Several such parallel tuned filters may be connected in series with each individual filter being tuned to a different harmonic. Such arrangements however tend to be very materially inefficient in terms of size and weight.

The output of rectifier 204 is applied to a storage capacitor 211 which is connected in parallel with the output leads of the rectifier 204 and with the input leads of a switching power unit 215 which may comprise a switching power converter. The amount of power that this power unit is able to process to a load connected to its output at terminals 217 and 218 is dependent on the current capacity of the AC line source 201 and the power factor. An enhanced high power factor increases the energy output of power unit 215 relative to a given input current supplied by the AC line source 201.

Figure 3:
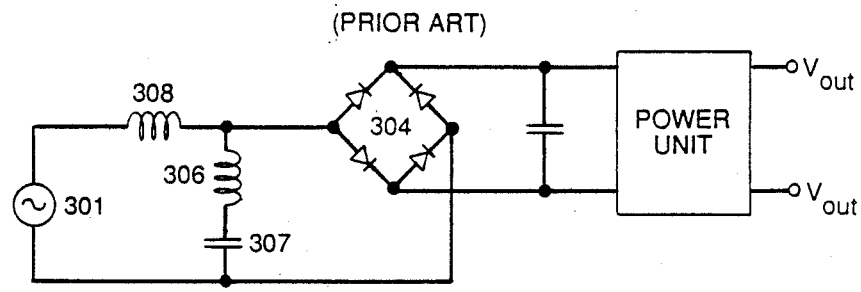
FIG. 3 is a schematic of an off line power switching type supply utilizing serially tuned passive filter network techniques of the prior art to bleed a specific odd harmonic and hence reduce the peak value of rectified current and improve input power factor.

Another illustrative arrangement of the prior art is shown in FIG. 3 wherein a series tuned filter, comprising an inductor 306 and a capacitor 307, is shunted across the input to the rectifier 304 and tuned to provide a shunt path for bleeding an odd input harmonic. An inductor 308 is included in the serial input path to the rectifier 304, to force the odd harmonic to flow through the tuned capacitor 306 and inductor 307 rather than inductor 308 and the AC line source. This arrangement is also very materially inefficient in terms of size and weight.

These passive filter network approaches of the prior art as a means of enhancing the input power factor are not suitable where the size and weight of the power supply is an important consideration. Active network approaches on the other hand are also often undesirable because of cost and reliability considerations.

Figure 4:
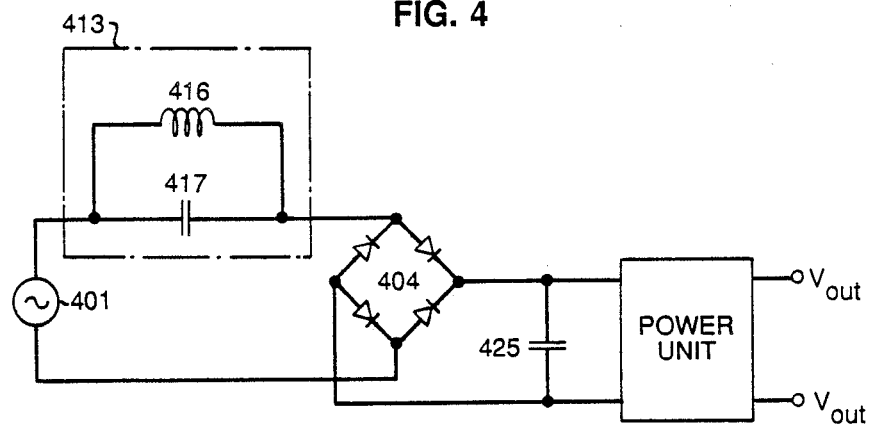
FIG. 4 is a schematic of an off line switching type power supply embodying the principles of the invention using a passive network technique to achieve a low power factor at its input.

A passive network arrangement for enhancing the input power factor of an off line switching power supply supplied by an AC line voltage source 401 that substantially avoids the above described disadvantages is shown in FIG. 4. A parallel connected LC circuit 413 is shown connected intermediate the AC line source 401 and a full wave rectifier 404. This LC ringing circuit 413 includes the inductor 416 and the capacitor 417. These components are selected to generate a periodic timed signal in response to the applied AC voltage supplied by the AC line source 401 and initiate early conduction in the rectifying diodes of the rectifier 404 to extend the duration of rectified current conduction, reduce the RMS of the rectified current and enhance the input power factor. The inductance and capacitance values are chosen so that during the non-conduction time of the diodes of the rectifier 404 the inductor 416 and the capacitor 417 ring such that the current in the inductor 416 and the voltage across the capacitor 417 add to the input AC line voltage on the rising portion of the next half cycle of the AC line voltage and cause the diodes in the bridge rectifier to conduct earlier in the AC line voltage half cycle and effect an increase in the rectifier conduction angle. This advantageous decreases the peak rectifier current, lowers the RMS of the line current and improves the input power factor.

Figure 6:
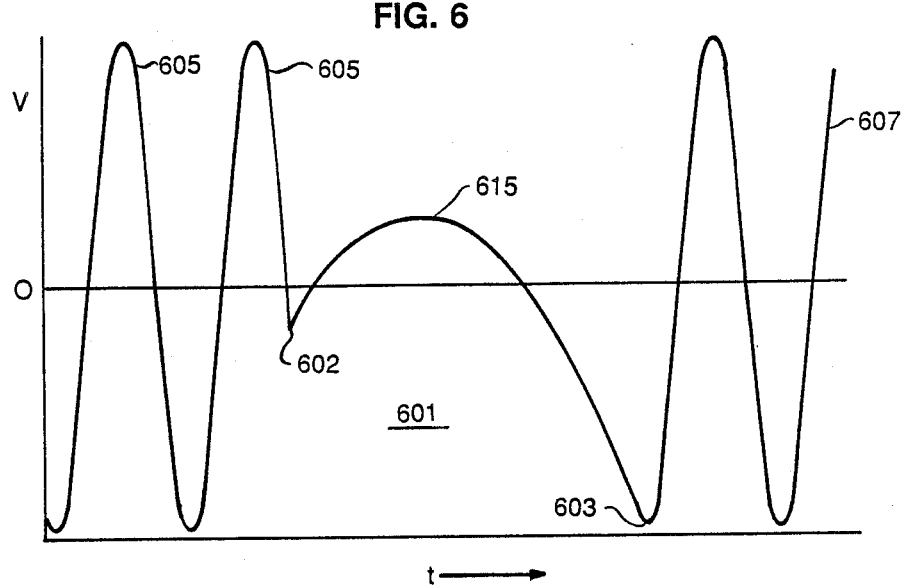
FIG. 6 is a waveform diagram the ringing voltage across a tank capacitor of the off line switching type power circuit of FIG. 4.
Figure 7:
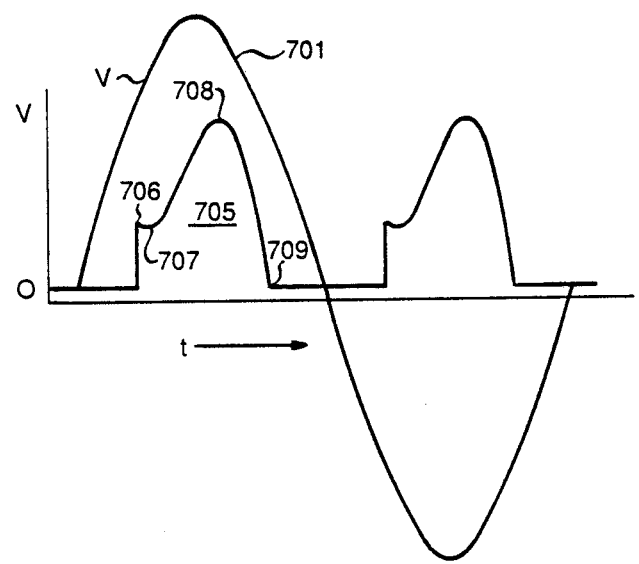
FIG. 7 is a waveform diagram of the input voltage and current of the off-line switching type power circuit of FIG. 5.

The operation of the circuit of FIG. 4 may be better understood by discussing the current and voltage waveforms of the circuit as shown in FIGS. 6 and 7. The applied voltage of the AC line source is shown by voltage waveform 701 shown in FIG. 7. Voltage across the capacitor 417, as shown by waveform 601 in FIG. 6, rings at a high frequency oscillatory waveform 605 due to energy stored in LC ringing circuit 413 until point 602 at which instant the rectifying diodes of rectifier 304 begin to conduct. Conduction of the rectifying diodes at this point completes a circuit path to the rectifier load including the storage capacitor 425 resulting in the current responsive voltage waveform 615 across the capacitor 417. At point 603 where the rectifying diodes cease conduction the ringing voltage waveform resumes as shown by voltage waveform 607 since the circuit path to the rectifier load is interrupted. The oscillatory voltage waveform 605 prior to point 602 and waveform 607 subsequent to point 603 rings at a frequency which in the illustrative embodiment is greater than six times the frequency of the input AC line voltage. The voltage at point 602 is added to the line source voltage 701 and is sufficient in magnitude at this point 602 to forward bias the rectifiers and initiate conduction therein advance of their expected normal angle of initiation of conduction. The resultant rectified current waveform 705 shown in FIG. 7 initially peaks at peak 706 and then dips at 707 followed by a soft pulse waveform 708 which terminates at point 709 which is at a conduction angle extended by the current inertia of the inductor 416.

A suitable technique of selecting component values for the ringing circuit 413 is to first determine the maximum inductance value for inductor 416 that will accommodate the desired power levels without saturating and mechanically fit within a typically limited volume within the power converter. A shunt capacitance value is selected so that the ringing network 413 oscillates at a frequency so that the voltage across the capacitor 417 will add to the input voltage to forward bias the rectifying diodes into conduction in advance of their normal conduction angle.

These component value selections may be readily made by simulating operation of the power circuit with a stored program circuit simulator by selecting an initial reactive value for one component and adjusting the reactive components by iterative circuit simulations to improve the power factor at the input and lower the peak of the rectifying current. In one illustrative example at a power level of 400 watts and an input AC voltage of 120 volts at 60 Hz the frequency of oscillation of the ringing circuit was 377 Hz. The value of the inductance was 7.3 millihenries and the capacitance was 24 microfarads. For a power level of 800 watts a suitable ringing circuit would have one half the inductance and twice the capacitance of the reactive values selected for 400 watts. The oscillating frequency of the ringing circuit would remain the same. At 200 watts twice the inductance and one half the capacitance would operate satisfactory. The reactive component and frequency values are meant to be illustrative only and are not intended to limit the scope of the invention. Improved power factors and reduced RMS current are achieved by designing a ringing circuit having a frequency such that during a time interval beginning when the rectifier conduction stops until sometime into the next half cycle of applied AC voltage the ringing tank circuit has rung a number of half cycles so the voltage across the tank capacitor adds to the input voltage sufficiently to prematurely initiate conduction in the rectifier diodes again.

Figure 5:
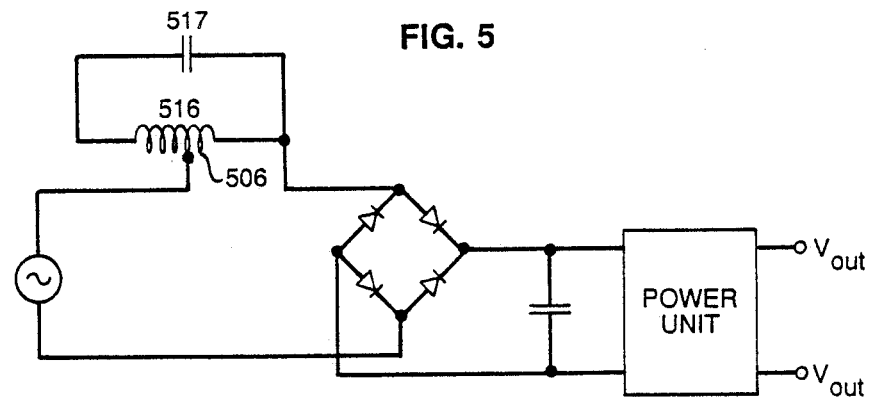
FIG. 5 is a schematic of an off line switching type power supply embodying the principles of the invention in which the size of the passive network is significantly reduced.

An off-line switching type power supply embodying the principles of the invention in which the size of the passive network is significantly reduced is shown schematically in FIG. 5. Inductor 516 is wound as an auto transformer in which a small portion of the winding 506 is connected in series with and intermediate to the AC line voltage source 501 and the full wave rectifier 504. The entire winding of the inductor 516 is connected in parallel with the ringing capacitor 517. This arrangement operates in the same manner as the circuit of FIG. 4 but permits the use of a higher voltage lower capacitance value ringing capacitor. This represents a saving of both size and weight as compared with a similarly rated circuit as shown in FIG. 4.

We claim:

1. An input network for a switching circuit, comprising:
    an input for accepting an AC voltage;
    an output for coupling DC voltage to a power switching circuit;
    a rectifier circuit intermediate the input and output, and including;
    a rectifying network of rectifiers, and a voltage storage capacitor intermediate the rectifying network and output; and
    a current waveform control circuit intermediate the input and the rectifying network, the current waveform control circuit having;
    an inductor and a capacitor connector at least partially in parallel circuit with each other, and the parallel circuit connected in series with the input, the inductor and capacitor having component values selected such that its induced resonant ringing is at a frequency exceeding six times a frequency of the AC voltage and at a non-harmonic and non-integer multiple of the frequency of the AC voltage applied to the input such that a voltage induced across the capacitor adds to a voltage of a leading edge of the AC voltage to enhance biasing the rectifiers into conduction and a voltage induced across the inductor enhances conduction in the rectifiers during a trailing edge of the AC voltage;
    whereby the parallel circuit ringing is operative for inducing conduction of the rectifiers prior to a first time instant when the applied AC voltage magnitude would bias the rectifiers into conduction and extending conduction beyond a second time instant when the applied AC voltage magnitude would permit the rectifiers to terminate conduction.

2. An input network for a switching circuit as claimed in claim 1, wherein the inductor includes a tapped winding connected such that a portion of the winding less than a whole of the winding is in series with the input and the winding in its entirety is in parallel with the capacitor.

3. An input network for a switching circuit as claimed in claim 1 wherein the inductor and capacitor have values such that the induced resonant ringing is at a frequency having a ratio of (377/60) n times a frequency of the AC voltage where n is an integer.

4. An input network for a switching circuit as claimed in claim 1 wherein the inductor and capacitor have values such that the induced resonant ringing is at a frequency that produces a voltage that adds to the AC voltage to initiate conduction in the diode rectifiers in advance of a time when the AC voltage alone would initiate conduction.

5. An input network for a switching circuit as claimed in claim 4 wherein the rectifying network comprises a full wave rectifier.

* * * * *